United States Patent
Reid

(10) Patent No.: US 11,385,899 B2
(45) Date of Patent: Jul. 12, 2022

(54) BRANCH PREDICTION CACHE FOR MULTIPLE SOFTWARE WORKLOADS

(71) Applicant: Arm Limited, Cambridge (GB)

(72) Inventor: Alastair David Reid, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/052,655

(22) PCT Filed: May 9, 2019

(86) PCT No.: PCT/GB2019/051273
§ 371 (c)(1),
(2) Date: Nov. 3, 2020

(87) PCT Pub. No.: WO2019/224518
PCT Pub. Date: Nov. 28, 2019

(65) Prior Publication Data
US 2021/0240479 A1 Aug. 5, 2021

(30) Foreign Application Priority Data
May 24, 2018 (GB) ..................... 1808527

(51) Int. Cl.
*G06F 9/30* (2018.01)
*G06F 9/38* (2018.01)

(52) U.S. Cl.
CPC .......... *G06F 9/3844* (2013.01); *G06F 9/3009* (2013.01); *G06F 9/30047* (2013.01); *G06F 9/3806* (2013.01); *G06F 9/3851* (2013.01)

(58) Field of Classification Search
CPC ... G06F 9/3806; G06F 9/3808; G06F 9/30145
See application file for complete search history.

(56) References Cited

U.S. PATENT DOCUMENTS

| 5,327,547 A | 7/1994 | Stiles et al. |
| 5,838,962 A * | 11/1998 | Larson ................. G06F 9/3844 |
| | | 712/239 |
| 6,108,775 A | 8/2000 | Shiell et al. |

(Continued)

OTHER PUBLICATIONS

International Search Report and Written Opinion of the ISA for PCT/GB2019/051273 dated Jul. 30, 2019, 14 pages.

(Continued)

*Primary Examiner* — Corey S Faherty
(74) *Attorney, Agent, or Firm* — Nixon & Vanderhye P.C.

(57) ABSTRACT

An apparatus comprises: processing circuitry 18 to process instructions from a plurality of software workloads; a branch prediction cache 40-42 to cache branch prediction state data selected from a plurality of sets of branch prediction state data 60 stored in a memory system 30, 32, 34, each set of branch prediction state data corresponding to one of said plurality of software workloads; and branch prediction circuitry 4 to predict an outcome of a branch instruction of a given software workload based on branch prediction state data cached in the branch prediction cache from the set of branch prediction state data corresponding to said given software workload. This is useful for mitigating against speculation side-channel attacks which exploit branch mispredictions caused by malicious training of a branch predictor.

15 Claims, 7 Drawing Sheets

(56) References Cited

U.S. PATENT DOCUMENTS

| | | | |
|---|---|---|---|
| 6,427,192 B1* | 7/2002 | Roberts | G06F 9/3806 |
| | | | 711/128 |
| 9,563,430 B2 | 2/2017 | Bonanno et al. | |
| 2013/0191825 A1 | 7/2013 | Muff et al. | |
| 2014/0019738 A1 | 1/2014 | Kataoka et al. | |
| 2015/0212822 A1 | 7/2015 | Hooker et al. | |
| 2017/0153895 A1 | 6/2017 | Gellerich et al. | |
| 2017/0286421 A1 | 10/2017 | Hayenga et al. | |

OTHER PUBLICATIONS

Search Report for GB 1808527.4 dated Nov. 23, 2018, 6 pages.
Whitepaper, "Cache Speculation Side-channels", Arm, Feb. 2018, 13 pages.
Office Action for EP Application No. 19724572.3 dated Mar. 25, 2022, 6 pages.

* cited by examiner

BRANCH PREDICTION CACHE FOR MULTIPLE SOFTWARE WORKLOADS

This application is the U.S. national phase of International Application No. PCT/GB2019/051273 filed May 9, 2019 which designated the U.S. and claims priority to GB Patent Application No. 1808527.4 filed May 24, 2018, the entire contents of each of which are hereby incorporated by reference.

The present technique relates to the field of data processing. More particularly, it relates to branch prediction.

A data processing apparatus may have branch prediction circuitry for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch is actually known.

At least some examples provide an apparatus comprising: processing circuitry to process instructions from a plurality of software workloads; a branch prediction cache to cache branch prediction state data selected from a plurality of sets of branch prediction state data stored in a memory system, each set of branch prediction state data corresponding to one of said plurality of software workloads; and branch prediction circuitry to predict an outcome of a branch instruction of a given software workload based on branch prediction state data cached in the branch prediction cache from the set of branch prediction state data corresponding to said given software workload.

At least some examples provide an apparatus comprising: means for processing instructions from a plurality of software workloads; means for caching branch prediction state data selected from a plurality of sets of branch prediction state data stored in a memory system, each set of branch prediction state data corresponding to one of said plurality of software workloads; and means for predicting an outcome of a branch instruction of a given software workload based on branch prediction state data cached in the branch prediction cache from the set of branch prediction state data corresponding to said given software workload.

At least some examples provide a data processing method comprising: processing instructions from a plurality of software workloads; caching, in a branch prediction cache, branch prediction state data selected from a plurality of sets of branch prediction state data stored in a memory system, each set of branch prediction state data corresponding to one of said plurality of software workloads; and predicting an outcome of a branch instruction of a given software workload based on branch prediction state data cached in the branch prediction cache from the set of branch prediction state data corresponding to said given software workload.

Further aspects, features and advantages of the present technique will be apparent from the following description of examples, which is to be read in conjunction with the accompanying drawings, in which:

FIG. 1 schematically illustrates an example of a data processing apparatus having branch prediction circuitry and a branch prediction cache;

FIG. 2 schematically illustrates a potential security attack which could exploit the branch predictor to trick more privileged code into leaking secret information to an attacker;

Figure 1:
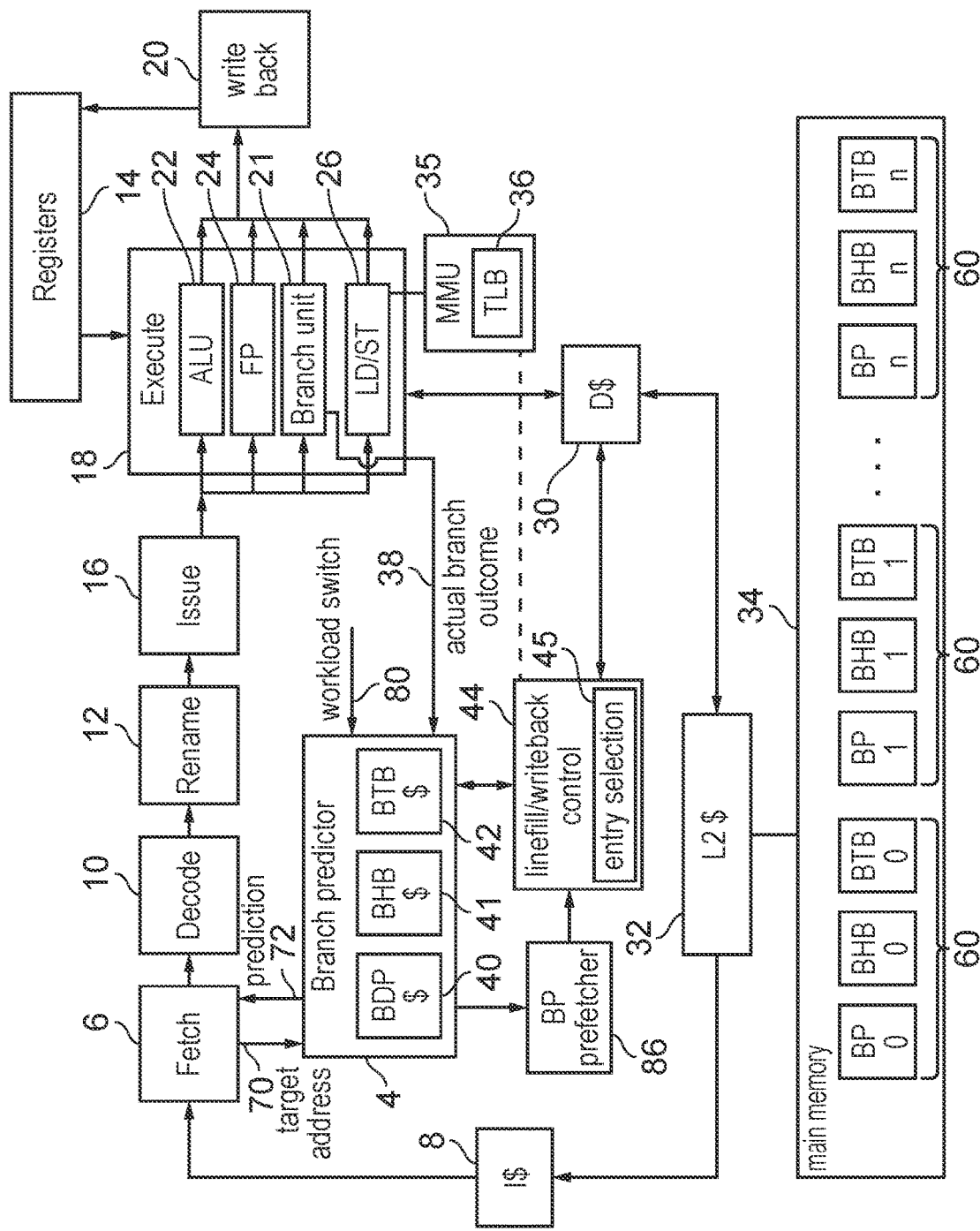

A data processing apparatus may have a branch prediction mechanism for predicting an outcome of a branch instruction. For example the predicted outcome may include whether or not the branch is taken, or could include the predicted target address of a branch instruction. Other properties of branches can also be predicted, such as whether a particular branch relates to a function call or whether a particular branch is expected to have an unpredictable branch address pattern so that different instances of execution of the same branch could lead to different target addresses being generated. Traditionally a branch prediction mechanism would be regarded as a performance-enhancing mechanism whose mispredictions are not critical to the security of data processed in a data processing apparatus, but merely affect the level of performance achieved. This is because if a branch is mispredicted then while the processing circuitry may temporarily execute the wrong instructions, once the actual branch outcome is determined and compared with a prediction, the misprediction may be detected and then a processing pipeline may be flushed of the subsequent instructions fetched based on the mispredicted branch, and the architectural state of the processor may be restored to the point at which the branch was encountered so as to cancel the architectural effects of subsequently speculated instructions which turn out to be incorrect.

However, recently it has been recognised that branch prediction circuitry could provide a route which an attacker could exploit to circumvent security protections which may be provided on a data processing apparatus to restrict some software workloads from accessing data associated with other software workloads. This is because in some branch predictors it is possible that a branch prediction state entry allocated to the branch predictor based on observed branch history in one software workload could be accessed from a different software workload and used to predict the outcome of that different software workload's branches. Previously, such use of branch prediction state from one workload to predict outcomes of branches in another workload would have been regarded as merely a performance issue, as if the second workload hits against the wrong entry of the branch predictor allocated by a first workload then any misprediction arising from this may be identified later and resolved once the actual branch outcome is known and this would have been expected merely to cause a delay in processing the correct branch outcome, but would not be expected to cause a security risk.

However, it has been recognised that instructions which are incorrectly speculatively executed due to a mispredicted branch may still influence data in a cache or another non-architectural storage structure used by a data processing apparatus. This could be exploited by an attacker to attempt to gain some information on potentially sensitive data which is not accessible to the attacker but is accessible to another software workload which can be tricked by the attacker into executing instructions designed to access the secret and cause changes in cache allocation which expose some information about the secret to the attacker. For example the attacker could train the branch predictor with a pattern of branch accesses, so that when the victim software workload later accesses the same entry then it will incorrectly execute an instruction from a wrong target address or follow a wrong prediction of whether a branch is taken or not taken, causing an inappropriate access to the secret information. Cache timing side channels can then be used to probe the effects of the incorrect speculation to leak information about the secret.

One way of addressing such attacks could be to tag entries in the branch predictor with an identifier of the corresponding software workload so that a given software workload can only use branch prediction state that is tagged with the corresponding workload identifier. However, the identifiers typically used in a data processing system to identify a particular software workload, such as a process identifier or address space identifier identifying an individual process and/or a virtual machine identifier identifying a virtual machine within which a given process operates, can be relatively long. For example such identifiers may comprise as many as 32 or 64 bits. If each entry of a branch predictor was tagged with a corresponding software workload identifier (or worse, a set of identifiers such as the combination of process ID and virtual machine ID) then this may greatly increase the size of each entry of the branch predictor. This is particularly a problem for branch direction predictors which predict whether or not a branch is taken or not taken, since for such branch direction predictors each item of branch prediction state may typically only comprise a few bits (e.g. a 2-bit confidence counter for tracking the confidence with which a branch should be predicted taken or not taken). Hence, tagging each entry would greatly increase the overhead of the branch predictor which may be unacceptable for circuit area constrained micro-architecture designs. Another issue with tagging is that to maintain a set of branch prediction state for each software workload so that the branches of that software workload can be adequately predicted, this would require a much greater number of entries to be provided in the branch prediction circuitry to accommodate all of the sets of branch prediction state for each workload (compared to a branch predictor which shares the same entries among all workloads). Hence, in practice, tagging of entries with a unique software workload identifier for each workload and restricting hits in the branch predictor to only the entries corresponding to the same workload can be impractical in terms of micro-architecture design.

In the technique discussed below, a branch prediction cache is provided to cache branch prediction state data selected from two or more sets of branch prediction state data stored in a memory system. Each set of branch prediction state data corresponds to one of a plurality of software workloads processed by the processing circuitry. The branch prediction circuitry predicts an outcome of a branch instruction of a given software workload based on branch prediction state data cached in the branch prediction cache from the set of branch prediction state data corresponding to the given software workload.

Hence, by storing multiple sets of branch prediction state data in the memory system this allows support for a large number of different software workloads each having their own set of branch prediction states, without requiring unfeasibly high area overhead in the micro-architecture to support a corresponding size of branch prediction cache local to the branch prediction circuitry. That is, the memory system effectively acts as a backing store for storing the full suite of branch prediction datasets for all of the software workloads, while a subset of this branch prediction state data is cached in the branch prediction cache for immediate access by the branch prediction circuitry, so that the cache itself need not have a larger circuit area budget than typical branch prediction structures sharing branch prediction state between workloads.

This approach can be seen as counter-intuitive since the branch prediction state data would typically be regarded as an aspect of the micro-architecture of a given processing pipeline which would not normally be exposed to memory. Also, one would expect that the delay associated with fetching branch prediction state data from the backing store in the memory system would be longer than the delay anticipated if no prediction was made at all and instead the pipeline waited for the actual branch instruction outcome to be available on execution before fetching subsequent instructions. Therefore it is unlikely that the memory system would be considered as a suitable location for storing the branch prediction state data. However, in practice changes in software workload may be relatively infrequent and the warm up delay to fetch in branch prediction state data when starting a new software workload may in any case be comparable to the warm up delay in a branch predictor which shares branch predictor entries between workloads, as the predictions previously made for one workload are gradually adapted in response to mispredicted branches for a second workload. In contrast, by using separate sets of branch prediction state data stored in the memory system then corrections based on actual branch outcomes in one workload do not pollute the branch prediction state used by another workload and so this can make the predictions for both workloads more accurate once they are brought into the cache, helping to mitigate some of the delay associated with fetching the branch prediction state data from the memory system. Another benefit of storing separate sets of branch prediction state data in the memory system is that, in a multi-processor system, when a given software workload is moved from one processor to another processor then if the branch prediction state data is stored in the memory this means the branch prediction state can also be migrated from one processor to another relatively easily without requiring dedicated branch prediction state transfer paths to be established, which can simplify processor system design and improve performance by avoiding a dip in prediction performance when a scheduler moves a software workload between processors. Hence, in practice the performance impact may be limited and by maintaining separate sets of branch prediction state data in the memory system for different software workloads this prevents an attacker operating one software workload from being able to use the branch prediction state data which it has trained using its workload to cause incorrect speculation in another software workload designed to expose information about secret data to the attacker.

In response to the processing circuitry switching from processing a first software workload to processing a second software workload, the branch prediction cache may prevent cached branch prediction state data of the set of branch prediction state data corresponding to the first software workload being used to predict an outcome of a branch instruction of the second software workload. For example, on a context switch between different software workloads, the branch prediction cache could invalidate entries associated with the first software workload. If any of the invalidated entries contain updated prediction state data which has changed relative to the corresponding prediction state in the memory system, then such dirty branch prediction state data can be written back to the memory system. The writeback could be performed at the time of the context switch between the first software workload and the second software workload, or could be deferred until it is desired to overwrite a given cached entry with new branch prediction state data associated with the second software workload. Hence, in general by updating cache state so that the branch prediction state data associated with the first software workload cannot be used to predict outcomes of branch instruction in the second software workload, this avoids the type of security attack discussed above.

The branch prediction cache may have a number of entries with each entry for caching a corresponding portion of branch prediction state data independent of any indication of which set of branch prediction state data the corresponding portion of branch prediction state data is selected from. That is, each entry of the branch prediction cache does not need to comprise any identifier of the particular software workload which corresponds to the branch prediction state data in that entry. By avoiding tagging entries with a process identifier or other identifier associated with a software workload, this avoids the great increase in area overhead which may be expected to arise from such tagging. This can be advantageous both for a branch target address predictor and for a branch direction predictor, but may provide a particular benefit for the branch direction predictor as the size of each item of branch prediction state data is often smaller and so tagging with a process identifier would cause a disproportionate increase in the size of each entry.

The branch prediction cache may ensure that all valid entries of the branch prediction cache relate to branch prediction state data from the same set of branch prediction state data corresponding to a given software workload. This avoids the need to include tags in each entry distinguishing which software workload a given entry relates to. The prevention of an entry associated with one software workload being used to make a prediction for another software workload can instead be ensured by invalidating the contents of the branch prediction cache when a change of software workload occurs. Lookups to the branch prediction cache can be made depending on instruction address, but independent of the current workload's workload identifier. The identity of the current workload may be considered on branch prediction cache linefills but not on each prediction lookup.

Note that when entries of the branch prediction cache are invalidated this does not mean that the corresponding branch prediction state data in memory needs to be invalidated. Instead, the branch prediction state data in memory may be retained and if necessary updated based on the evicted data from the branch prediction cache so that the branch prediction state data can persist beyond one instance of executing a given software workload and be restored the next time the same software workload is executed.

In response to the processing circuitry switching from processing a first software workload to a second software workload, the branch prediction cache may trigger at least one state fetch request to the memory system to request that a portion of the set of branch prediction state data corresponding to the second software workload is fetched into the branch prediction cache. Hence, loading of the new set of branch prediction state data associated with the incoming software workload may be triggered automatically by the context switch from the first software workload to the second software workload.

In some cases the portion of the set of branch prediction state data fetched into the branch prediction cache on the context switch may comprise the entire set of branch prediction state data associated with the second software workload. This approach can reduce the performance impact on the processor pipeline when subsequent branches are encountered as it means that the relevant branch prediction state data has been fetched as early as possible following the context switch.

However in other cases the portion of the set of branch prediction state data fetched in response to the switch from the first software workload to the second software workload may comprise a proper subset of the branch prediction state data corresponding to the second software workload. That is, not all of the set of branch prediction state data associated with the second software workload may be fetched into the branch prediction cache in response to the context switch. Instead, a smaller portion can be fetched in initially and then remaining portions of the branch prediction state data can be fetched into the branch prediction cache in smaller pieces on demand when required for a given branch instruction. This approach can avoid using up so much memory access bandwidth at the time of the context switch which could otherwise impact on the performance of actual data memory accesses made by the incoming second software workload.

The branch prediction cache may be responsive to a miss in the branch prediction cache for a target instruction address of an instruction of a given software workload for which a branch prediction is required, to trigger at least one state fetch request to the memory system to request that a corresponding portion of the set of branch prediction state data corresponding to the given software workload is fetched into the branch prediction cache. Hence, if a target instruction address is encountered for which a branch prediction is required then this may then trigger fetching of the corresponding portion of branch prediction state data if it is not already present in the branch prediction cache. By splitting the set of branch prediction state for a given software workload into a number of pieces that are temporarily cached by the branch prediction cache but can be written back to lower levels of the memory system, this reduces latency of context switches and avoids placing restrictions on the total state size.

In other implementations, it may be possible to not trigger any state fetch request in response to the context switch itself, but to fetch all of the branch prediction data on demand so that a given portion of branch prediction state data is fetched into the branch prediction cache only when an address is encountered which would require that branch prediction state data.

In practice a balance between these two approaches may be the most efficient where an initial portion of the branch prediction state data is fetched in response to the context switch and then subsequent portions are fetched on demand later.

When branch prediction state data is evicted from the branch prediction cache (either on a context switch when branch prediction state data is being invalidated, or when a given branch prediction state data is overwritten subsequently based on on-demand fetching of branch prediction state data), then if the evicted data is dirty (has changed relative to the corresponding branch prediction state data in memory), the branch prediction cache may trigger at least one writeback request to request that the dirty branch prediction state data is written back to the memory system. Such writebacks would not normally be required for a branch predictor since one would normally expect that the branch predictor retains a complete record of the branch prediction state within the micro-architecture of the processing pipeline design, rather than acting as a cache of a backing store in the memory system.

Typical branch predictors are normally designed to have a storage arrangement whereby the entry of the branch predictor for predicting the outcome of a branch at a given target instruction address is identified based on a hash algorithm applied to the target instruction address, where the hash is designed to ensure that neighbouring addresses map to different entries of the branch predictor. That is, branch predictors (including both branch direction predictors and branch target address predictors) are typically designed to have very little locality to avoid hotspots where a number of branches encountered in the same region of program code compete for access to the same branch prediction entry.

However, the inventor recognised that if such typical branch predictor hashing schemes are applied to the branch prediction cache discussed above, then this may provide very poor performance in the transfer of items of branch prediction state data between the branch prediction cache and the memory system. This is because as a given software workload processes a given section of program code, with traditional branch prediction mapping schemes the addresses of nearby branches would be mapped onto very different entries of the branch prediction state dataset which may then require a number of separate fetch operations in order to load them from the memory system into the branch prediction cache. Hence, with a branch prediction cache which caches a subset of branch prediction state data from the memory system it can be useful to provide an address mapping scheme which provides increased locality compared to conventional branch prediction hashing schemes.

The branch prediction cache may cache items of branch prediction state information at a granularity corresponding to an address range of a predetermined size. This means that the branch prediction circuitry may be capable of making different predictions of branch instruction outcomes for addresses in adjacent address ranges of the predetermined size. That is, the predetermined size may be the minimum address range for which a separate prediction can be made from the next address range of the same size.

The apparatus may have state transfer circuitry to transfer branch prediction state data between the branch prediction cache and the memory system in units of a given size, where each unit comprises branch prediction state data for making branch predictions for at least one block of instruction addresses, and each such block of instruction addresses covers a contiguous address range of a greater size than the predetermined size used as the granularity for the branch prediction cache. Hence, the address range for which the branch prediction state can be transferred to the branch prediction cache in a single data transfer may be greater than the granularity with which independent predictions are represented within the branch prediction cache. This enables improved memory access performance as it may reduce the number of memory accesses required to load in the branch prediction state for predicting branch prediction outcomes for a given section of program code.

In one example, the apparatus may have selection circuitry to select, in response to a target address of a given instruction of the given software workload, a corresponding item of branch prediction state data from the set of branch prediction state data corresponding to the given software workload. For example the selection circuitry could be lookup circuitry for selecting which entry of the branch prediction cache to lookup in response to the target address, or could be included in circuitry for generating a memory address from which required branch prediction state is to be fetched when there is a miss in the branch prediction cache or when there is a context switch between software workloads (in practice the lookup circuitry and memory address generating circuitry could share some portions). In some examples, the selection circuitry may also select the item of branch prediction state data based on branch history information indicating a pattern of previous branch outcomes (e.g. the not taken/taken results of a number of most recently executed branches), in addition to the target address, which can help to provide more accurate predictions as different predictions can be generated for different routes taken through a program into the same branch.

The set of branch prediction state data corresponding to a given software workload may comprise a number of sub-tables and the selection circuitry may select one of the sub-tables based on a first portion of the target address. An item of branch prediction state data for providing an individual prediction may be selected from the selected sub table based on a function of a second portion of the target address. Each sub-table may provide branch prediction state data corresponding to at least one block of instruction addresses covering a contiguous address range of the greater size than the predetermined size as discussed above. The selection of the sub-table therefore enables selection of a unit of branch prediction state data which can be transferred into the branch prediction cache in a single data transfer and then individual items of branch prediction state data can be selected from the selected sub-table based on a function of a remaining portion of the target address (such as a hash function similar to the hash functions used in conventional branch predictors, but based on a smaller portion of the target address, so as to reduce locality within the sub-table and reduce hotspots).

In other words, with this approach using sub-tables, each sub-table may act as a separate cache entry of the branch prediction cache but may include within that cache entry a number of separate items of prediction state for different address ranges of the predetermined size. By treating each cache entry as an independent sub-table for some subset of the address space, this increases locality to improve memory access performance for the branch prediction cache.

Note that a given sub-table may be mapped to multiple different blocks of addresses at non-contiguous locations, but with each block covering a contiguous address range of the greater size than the predetermined size. The selection function used to select the sub-table may share a single sub-table between multiple discontiguous blocks of addresses, in the expectation that the predictions made by the branch predictor when the program code was executing instructions from one of those discontiguous blocks may no longer be relevant when the same workload then subsequently reaches another of those discontiguous blocks, so that the predictions previously made for the first region of code can be overwritten with those for the next region. This can avoid the need to provide as many sub-tables for a given software workload, limiting the memory capacity overhead for storing the set of branch prediction state data.

The first portion of the target address used to select the sub-table may be a more significant portion than at least part of the second portion used to select an individual item of branch prediction state data within the sub-table. In some cases the first portion may be the most significant portion of the target address. However, in other examples the first portion may be an intermediate portion of the target address so that the second portion of the target address may comprise not only a portion less significant than the first portion but also optionally one or more bits which are more significant than the first portion.

A branch prediction state prefetcher may be provided to prefetch, into the branch prediction cache, branch prediction state data associated with addresses for which branch prediction is predicted to be required in future. The branch prediction state prefetcher could operate similar to a hardware data prefetcher trained based on data access addresses to predict future data address access patterns, for example a stride pattern where the addresses accessed are incremented in a regular pattern of offsets. The branch prediction state prefetcher could be trained based on the instruction addresses supplied to the branch predictor in a similar manner so that if the program code is stepping through execution of a sequence of instructions then the branch prediction state could look ahead of the current point of program execution reached by the fetch stage to prefetch the branch prediction state data for instructions predicted to be reached soon, before the fetch stage actually reaches those instructions. This can help to improve performance by reducing the delay associated with obtaining the relevant branch prediction state data for the current instruction.

The technique discussed in this application can be applied to a branch target buffer (also known as a branch target address predictor), which predicts, as the outcome of the branch instruction, a target address of the branch instruction. The target address of a branch is the address to which the branch redirects program flow. Alternatively, the technique could be applied to a branch direction predictor, for which the predicted outcome of the branch instruction is an indication of whether the branch should be taken or not taken. It will be appreciated that the technique discussed above could be applied only to one of these types of branch prediction structure, or to both in the same system.

The branch prediction state data may be stored in an addressable region of the memory system which can be accessed by at least some software workloads by issuing a load/store operation executed by the processing circuitry which specifies the address mapped to the region storing the branch prediction state data. Hence, rather than storing the data in a micro-architectural data store which is not immediately accessible to the instructions executed by the processing circuitry, the branch prediction state data may be stored in an addressable region of the normal memory accessed by the processing circuitry. For example, an operating system could allocate some extra space within the region of memory allocated to a given process to store that process's branch prediction state.

For at least some software workloads executed on the processing circuitry, however, the set of branch prediction state data for a given software workload may be stored in a memory region which is inaccessible to that given software workload. For example, memory protection attributes may be specified for the region storing the corresponding set of branch prediction state data so as to restrict access to the branch prediction state data to more privileged processes than the given software workload whose branch prediction state data is being stored. For example, the branch prediction state data for a given process may be inaccessible to that process but could be accessible to an operating system supervising that process. Alternatively, in some cases, the system may be implemented so that sets of branch prediction state data are not accessible to any software workload executing on the processor (although they are allocated to regions of the generally addressable memory), so that the only system element which is allowed to access the addressable region of memory may be the element associated with the branch predictor which controls fetching and writeback of branch prediction states.

In cases where the branch prediction state data is visible to at least some software workloads through general purpose load store instructions executed by the processing circuitry, the corresponding region of memory may be made read-only to those instructions to prevent the ability for an attacker to write incorrect branch prediction state data to the memory system in an attempt to induce the form of attack discussed above. For example, the only system element allowed to write to the region of memory storing a set of branch prediction state data for a given software workload may be the branch prediction cache or branch prediction circuitry itself (or any corresponding logic for controlling writebacks of branch prediction state data from the branch prediction cache).

Each software workload may comprise one of: a software process executed by the processing circuitry; a group of software processes executed by the processing circuitry; a specific portion of a software process; instructions of a software process having instruction addresses in a specific address range; a portion of a software process bounded by one or more workload dividing instructions; one of a plurality of threads executed by the processing circuitry corresponding to the same process; or a sub-group of threads among said plurality of threads.

Hence there is flexibility in exactly how processes or threads processed by the processing circuitry may be assigned to different software workloads each having a corresponding set of branch prediction state data. In some cases if a group of software processes are considered to not cause each other a risk in terms of the form of attacks discussed above then they could be mapped to the same set of branch prediction state data, whereas other software processes or threads which are deemed to cause a risk could be assigned to separate workloads having different sets of branch prediction state data. In some cases specific portions of software processes could be mapped to different sets of branch prediction state, even within the same software process. For example, an internet browser may partition different browser tabs to have their own set of branch prediction state data, to avoid one tab affecting another. Similarly, different software libraries used by a single process could be mapped to different sets of branch prediction state. Where different portions of a software process are considered as different software workloads, then the division between the portions could be in terms of particular address ranges so that instructions of a software process having instruction addresses in a specific address range could be considered to be one software workload while instructions in a different address range could be mapped to a different software workload having a different set of branch prediction state data. Another option is that workload dividing instructions could be provided to mark the points at which a given software process is split between workloads.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

The branch predictor 4 may include structures for predicting various outcomes of branch instructions. For example the branch predictor 4 may include a branch direction predictor which predicts whether conditional branches should be taken or not taken. The branch direction predictor may be a relatively small structure, as each entry may, for a given instruction address or block of instruction addresses, provide a confidence counter with relatively few bits (e.g. 2 or 3 bits), which is incremented or decremented towards a "taken" indication or a "not taken" indication as confidence in those predictions increases and adjusted to reverse previous increases in confidence when a misprediction occurs. Another aspect of branch outcomes that can be predicted may be the target address of a branch. For example, some branch instructions calculate the target address indirectly based on values stored in the registers 14 and so can branch to addresses which are not deterministically known from the program code itself. The branch target buffer (BTB) (also known as branch target address cache (BTAC)) may be a portion of the branch predictor 4 which has a number of entries each providing a prediction of the target address of any branches occurring within a given block of instructions. Optionally the BTB or BTAC may also provide other information about branches, such as prediction of the specific type of branch (e.g., function call, function return, etc.). Again, predictions made by the BTB/BTAC may be refined based on the actual branch outcomes 38 determined for executed branch instructions by the branch unit 21 of the execute stage. Another structure which could be included in a branch predictor 4 may be a branch history buffer (BHB) which may record information about history of previously executed branches (e.g. a sequence of previous taken/not taken outcomes) which can be used as an additional input for generating the index into the BTB for example.

The processing pipeline shown in FIG. 1 may support execution of a number of different software workloads. The software workloads could include different processes executing according to different program code, or could include multiple threads corresponding to the same process. Also, in some cases different portions within a process could be regarded as different workloads, for example certain address ranges within the process could be marked as a separate workload.

When different processes execute on the same pipeline, typically the branch predictor 4 has been shared between those processes. As different processes may have different branch behaviour at the same instruction address, this can mean that looking up the branch predictor structures for a given instruction address could provide predicted behaviour which may not be relevant to one process because it has been trained based on another process. Typically, branch mispredictions resulting from one process accessing a branch prediction entry that was trained by another process would have been regarded as merely an issue affecting performance rather than affecting security, since if the prediction is incorrect then this will be detected when the branch is actually executed in the branch unit 21 and then the branch unit can trigger the pipeline to be flushed of subsequent instructions fetched incorrectly based on the misprediction, and the processor state can be rewound to the last correct state resulting from the last correctly predicted instruction.

Figure 2:
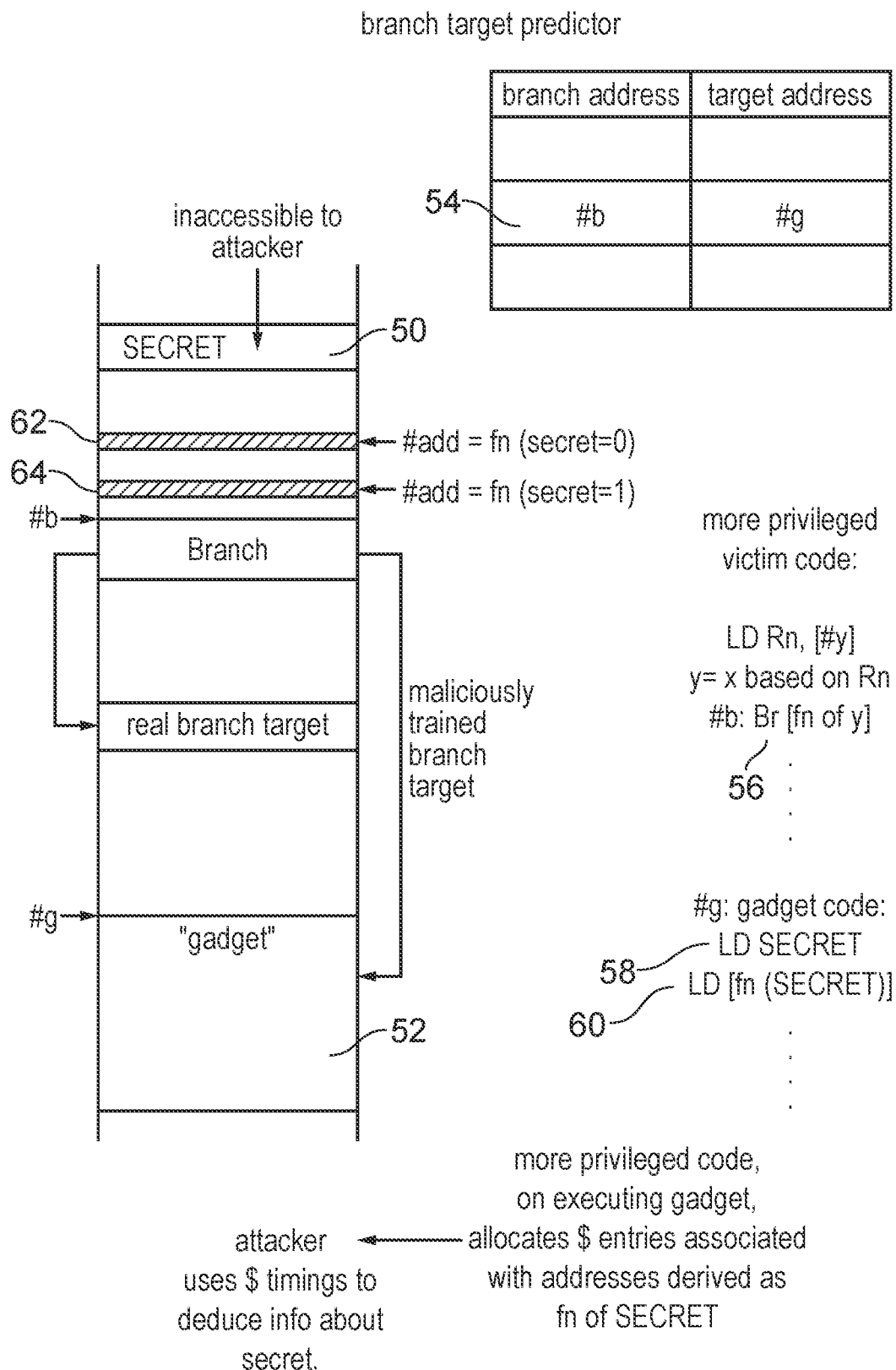

However, while the architectural effects of a misprediction may be reversed, the misprediction may cause longer lasting effects on micro-architectural state such as the data cache 30 or TLB 36. It has recently been recognised that it is possible for an attacker to exploit the branch predictor 4 to gain access to secret information that the attacker should not have access to. The memory management unit 35 may apply a privilege scheme so that only processes executed at certain privilege levels are allowed to access certain regions of memory. For example, as shown in FIG. 2 some secret data 50 may be inaccessible to the attacker's process (e.g. because the attacker's process runs at a lowest privilege level), but may be accessible to a process operating at a higher privilege level such as an operating system or hypervisor. The secret data can be any data which is considered sensitive, such as a password, personal financial details etc. The attack may be based on training the branch predictor 4 so that a branch within the victim code executed at a more privileged state of the processor branches to some gadget code 52 which the more privileged victim code is not intended to execute but executes incorrectly because of a branch misprediction in a branch of the victim code which is unrelated to the secret 50. The gadget code may be designed by the attacker to access a memory address which is computed based on the secret data 50, so that data (or other information such as TLB entries) associated with a memory address which depends on the secret data is loaded into one of the caches 30, 32, 36 of the data processing system.

More particularly, the attacker may have previously executed patterns of instructions which ensure that an entry 54 is allocated to the branch target buffer of the branch predictor 4 so that when an instruction at a branch instruction address #b is executed then the BTB returns a prediction of the target address #g which corresponds to the location of the gadget code 52. The branch instruction address #b may be chosen by the attacker so that it corresponds an address of a particular branch instruction 56 within the victim code (or alternatively #b could be an address of a non-branch instruction of the victim code since some forms of branch predictor 4 may in addition to predicting the actual target address for branches also effectively predict whether instructions are branch instructions at all, and so mistraining the branch predictor to predict that a non-branch instruction is a branch instruction branching to #g could also achieve the same effect).

Hence, when the victim code executes it reaches the instruction 56 at address #b and when the branch predictor 4 is looked up this may return the target address of #g causing the more privileged victim code to switch to the gadget code 52 at address #g. As the processor is still in the more privileged state associated with the victim code, the gadget code 52 provided by the attacker now executes having the same access permissions that would be provided to the victim code, which may allow access to regions of memory which are not accessible to the attacker's less privileged code. The gadget code may include a first load instruction 58 which loads the secret data 50, and a second load instruction 60 which loads data from a target address which is computed as a function of the secret loaded by the first load instruction 58. The attacker may have chosen this address computation function so that, depending on the value of the secret (or the value of selected bits of the secret), the computed address can take one of several values 62, 64 as shown in the left hand part of FIG. 2. In this example, for conciseness two possible values 62 and 64 of the computed address are shown, for example this could be based on a function where the computed address depends on a single bit extracted from the secret. It will be appreciated that when the function is computed based on more bits of the secret then the computed address could take more than two different values. Hence, depending on the value of the secret, information associated with different addresses may be loaded from memory and this may cause an entry to be allocated in a cache structure 30, 32, 36 for one of the addresses 62, 64.

The allocation of a new entry for one of addresses 62, 64 could also result in other entries being evicted from one of the cache structures 30, 32, 36. Cache structures may often be implemented in a set-associative manner which means that an entry for a given address can only be allocated to one of a limited set of locations rather than being allocated to any location within the cache structure. The group of addresses which index into the same set can be known in advance, or can be deduced by analysing the time taken to access different patterns of addresses to infer which addresses tend to conflict for cache resource causing increased access latency. Therefore, the attacker may be able deduce from cache access timings which address has been evicted from the cache to make way for the information loaded by the second load 60, and hence determine which of the potential candidate addresses 62, 64 was calculated based on the secret. That is, by measuring cache access timings to a number of addresses the attacker can deduce some information about the secret. While this information may not be sufficient to completely identify the secret, by repeating the attack on multiple occasions, for example with different address computation functions using different parts of the secret, the attacker can gradually piece together more information about the secret in order to derive some sensitive data which the attacker should not be allowed to access.

FIG. 2 merely shows one example of a potential way of using the branch predictor to attack secret information and expose it to less privilege code. This form of attack exploits the fact that many different execution contexts with different security needs and levels of trust may often share a single set of branch predictor state which allows the attacker to affect the execution of another process and monitor the branch pattern of another process. It also provides a way for the attacker to reduce performance in other processes by changing the branch prediction state to cause a large number of mispredicted branches.

One possible mitigation for these types of attacks may be to flush the branch prediction state from the branch predictor each time a context switch occurs, but this approach may be expensive because each time a given process returns for another slot of execution then it may have to derive its branch prediction state from scratch again which may cause many additional mispredictions impacting on performance. Another approach may be to tag each item of branch prediction state (in either the branch direction predictor or the BTB) with a process identifier so that they are only used if they were allocated by the same process as the one that is currently executing. However, this may also be expensive in terms of circuit area and power because to uniquely identify each individual software workload which requires a different set of branch prediction state, this may require an identifier with a relatively large number of bits. In practice the branch prediction state entries may be relatively small, especially for a branch direction predictor where an individual branch prediction entry could be as small as two bits. Hence, adding an additional workload identifier to every entry of the branch predictor may result in a great increase in the storage capacity required for the branch prediction structures and the corresponding comparison logic for comparing the current workload identifier with the identifier in the branch prediction entry. Also, this approach would require a greater total number of entries to be provided in the branch predictor so that it is possible to accommodate multiple sets of independent branch prediction states for different software workloads in the same micro-architectural structure.

In the approach discussed below, instead of storing all the branch prediction state in the branch predictor 4 itself, sets of branch predictor state 60 corresponding to individual software workloads may be stored in the memory system 30, 32, 34 which may provide a backing store to smaller branch prediction cache structures 40, 41, 42 provided in the micro architecture of the branch predictor 4. Each set of branch prediction state 60 may correspond to a particular software workload, which could be an individual process, a group of processes, a portion of code at specific address ranges within a process, a portion of code lying between successive workload dividing instructions within a given process, or could be an individual thread of a number of threads corresponding to the same process. Linefill and write back control circuitry 44 may control the transfer of branch prediction state between the branch prediction caches 40-42 and the memory system 30, 32, 34.

While for conciseness in FIG. 1 the sets of branch prediction state 60 in main memory are shown only in the main memory 34 it will be appreciated that portions of this data can be allocated to the caches 30, 32 as well. The sets of branch prediction states 60 can be stored in regions of memory which are allocated to the corresponding software workloads, for example by a supervising process such as an operating system or hypervisor. In some cases the set of branch prediction state 60 may be allocated to a region of memory which is inaccessible to the corresponding software workload itself so that a given workflow cannot see its own branch prediction data. The regions of memory storing the branch prediction data sets 60 may be made read only to instructions executed within the load store unit 26 so that the only element of the system permitted to write to the sets of branch prediction state may be the linefill/write back control circuitry 44, to avoid an attacker being able to corrupt the branch prediction state for a given software workload. Hence, by storing the branch prediction state (which may include one, two, or all of the branch direction prediction state BP, the branch history buffer state BHB, and the branch target buffer state BTB) in the memory system 30, 32, 34 (in RAM), this allows support for a large number of processes or software workloads to each have their own set of branch prediction state. In some cases different software libraries or different browser tabs could have their own sets of branch prediction state. The branch prediction cache structures 40-42 may be arranged to ensure that when the pipeline is executing instructions from a given software workload then only the branch prediction state from the set 60 corresponding to that workload can be used to make predictions, which mitigates against the form of attack shown in FIG. 2 since it is no longer possible for an attacker's process associated with one set 60 of branch prediction state to train the branch prediction state in a way which would affect another process executing with a different set of branch prediction state. While FIG. 1 shows an example where all of the BDP, BHB and BTB act as a cache of branch prediction state stored in a backing store in main memory, this is not essential and in other examples the state from one or more of these structures (e.g. the BHB) could simply be discarded on a workload switch rather than being saved to memory, while other forms of branch prediction state could still be stored to memory 34.

Figure 3:
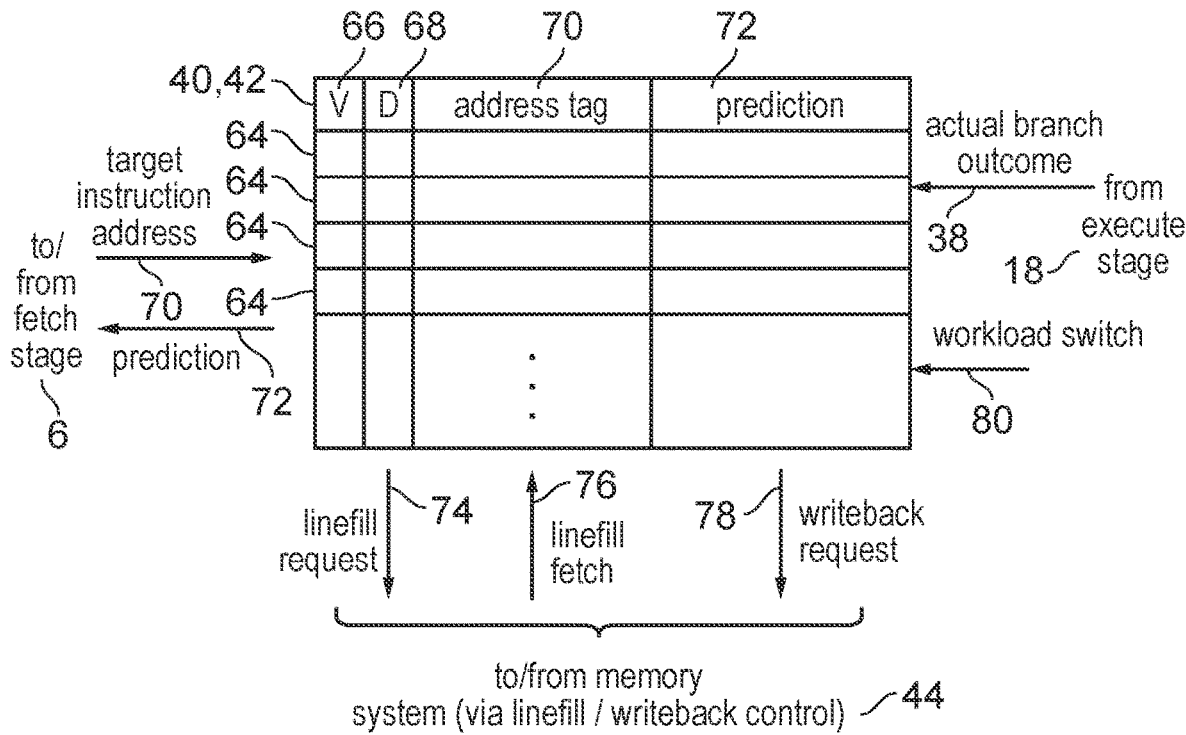
FIG. 3 shows an example of a branch prediction cache for caching portions of branch prediction state data from backup storage in a memory system.

FIG. 3 shows an example of the branch prediction cache structure 40-42 in more detail. For conciseness these structures will both be referred to as a branch prediction cache below. It will be appreciated that the branch prediction cache could be either the branch direction prediction cache 40 which caches information predicting branch taken/not taken outcomes, or a BHB cache 41 which caches portions of the branch history information corresponding to a branch history buffer, or the BTB cache 42 which caches predictions of target addresses for branches.

The branch prediction cache 40-42 has a number of entries 64 which each provide predictions for a corresponding block of instruction addresses. Each entry may have a valid flag 66 indicating whether the entry provides valid data, a dirty flag 68 indicating whether the prediction provided by the entry 64 has changed since the entry was allocated but has not yet been written back to the corresponding set 60 of branch prediction state stored in the memory 34, an address tag 70 which is used to identify which entry relates to a particular address and prediction state 72 which provides the predicted branch outcome for the corresponding block of address. It will be appreciated that the cache arrangement could vary from that shown in FIG. 3, and that each entry can include other forms of information not shown in FIG. 3.

As shown in FIG. 3, the branch prediction cache 40-42 (or the branch predictor 4 in general) may have interfaces to the fetch stage 6, the execute stage 18 and to the memory system 30, 32, 34 via the line fill/write back control circuitry 44. The branch prediction cache may be looked up based on a target instruction address 70 provided from the fetch stage 6, and if there is an entry in the branch prediction cache corresponding to that target instruction address then the cache returns a prediction 72 of the corresponding branch outcome to the fetch stage, which is used to control the fetching of subsequent instructions form the instruction cache 8.

If a given target instruction address 70 misses in the cache (there is not currently a valid entry corresponding to that instruction address), then a linefill request 74 may be issued to the linefill/write back control circuitry 44 which may have entry selection circuitry 45 which computes the relevant memory address storing the relevant item of branch prediction state from the set 60 corresponding to the current software workload and then issues a request to the memory system to fetch the relevant entry into the cache. In some cases the memory access request requesting that the relevant branch prediction state is loaded into the branch prediction cache 40-42 may go via the load store unit 26 and/or the MMU 35. Alternatively the line fill/writeback control 44 could have a separate interface into the memory. The branch prediction state may be assigned to physical addresses or to virtual addresses, and if they are assigned to virtual addresses then address translation using the TLB 36 may be required in order to generate the actual physical address storing the relevant branch prediction state.

Eventually, in response to the linefill request a linefill fetch response 76 is returned from the memory system providing the requested branch prediction state data and then this can be allocated into a given entry of the branch prediction cache 40-42. If it is necessary to evict other branch prediction state data to make way for the newly allocated entry then a writeback request 78 may be sent to the memory system if the data in the evicted entry was dirty as indicated by the dirty flag 68. In a multi-processor system, if multiple processors share the same set of branch prediction data, then in some examples a coherency scheme may be applied to ensure that the writeback of branch prediction state triggered by one processor is visible to other processors which may have cached the same branch prediction data in the branch prediction cache 40-42 of the other processors. However, ensuring coherency between the branch prediction state in one processor and corresponding branch prediction state is not essential, as in practice if the branch prediction state becomes inconsistent, the penalty is merely a misprediction rather than incorrect processing results, so other implementations may prefer not to guarantee coherency for the branch prediction state cached in different processors of a multi-processor system, to save on circuit area and complexity.

When instructions are speculatively fetched, decoded, issued and executed based on a branch prediction made on the branch predictor 4, eventually the actual branch outcome 38 is returned from the execute stage 18 and this can be compared with the prediction currently indicated in the relevant entry of the branch prediction cache 40-42. If the branch was mispredicted then the prediction can be updated to increase the likelihood that the prediction will be correct in future. For example confidence counters can be incremented or decremented and predicted outcomes can be changed if confidence in a different prediction has risen sufficiently high to override the previous prediction. If the return of the actual branch outcome 38 causes the prediction to be changed then this may cause the dirty flag 68 to be set so that the eviction of this branch prediction state at a later time will trigger a write back request 78 to update the corresponding out of branch prediction state within the memory system.

When the processing switches between software workloads then a signal 80 is provided to the branch predictor 4 by any element of the pipeline which is capable of detecting the workload switch. For example the fetch stage 6 could recognise that instruction fetch addresses have reached a program instruction address which marks the boundary between different software workloads, or the decode stage 10 could detect that a workload dividing instruction has been encountered and inform the branch predictor of the switch in workloads. Also, the execute stage 18 could mark the switch of workload when detected and signal this to the branch predictor 4. Also in some cases the switch of workloads may be triggered by an interrupt or exception and in this case the workload switching signal 80 may be signalled by the interrupt controller. Regardless of the source of the workload switching signal 80, in response to the workload switching signal 80 the branch prediction cache 40-42 may invalidate all of the entries in the branch prediction cache by clearing the valid bit 66 for each entry. This ensures that any previously allocated branch prediction state will not be used to make a prediction for the incoming workload when it was trained based on the previous workload. If any of the entries 64 contained dirty prediction data as marked by the dirty flag 68, then write back requests 78 may be triggered by the linefill/writeback control circuitry 44 to cause the dirty state to be written back to the corresponding set of the branch prediction state in the memory system so that if the outgoing workload is later executed again then it can benefit from any of the previously derived predictions trained based on actual branch outcomes 48.

Figure 4:
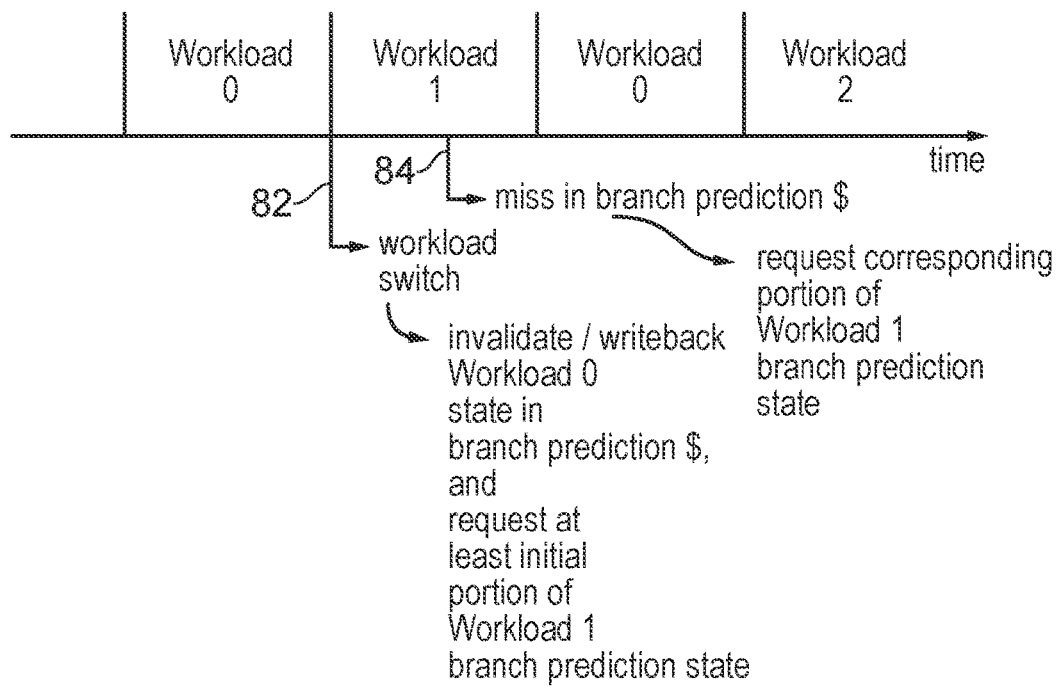
FIG. 4 shows an example of switching between workloads and in a corresponding manner switching between sets of branch prediction state data.

FIG. 4 illustrates an example of context switches between workloads. Initially workload 0 is executed, and then a workload switch (or context switch) 82 occurs to trigger the processing pipeline to switch to workload 1. As discussed above, at this point all the entries of the branch prediction cache 40-42 are invalidated and any dirty state is written back to the branch prediction dataset associated with workload 0. To populate the cache with the branch prediction state associated with the incoming workload 1, the workload switch 82 also triggers the linefill/writeback control circuitry 44 to issue fetch requests to the memory system for at least an initial portion of the set 60 of branch prediction state associated with workload 1. In some cases the entire set of branch prediction state for workload 1 can be requested at this point. However, for improved performance it may be more efficient to load the state in smaller pieces on demand, for example one cache line at a time. Hence the set of branch prediction state 60 could be split into a number of pieces that are temporarily cached by the branch prediction cache 40-42 but can be written back to lower levels the memory hierarchy when required. This reduces the latency of context switches and avoids requiring restrictions on the total state size.

In cases where not all of the set of branch prediction state for the incoming workload is loaded in response to the workload switch then it is possible that later miss 84 in the branch prediction cache 40-42 may be detected when the cache does not currently have a valid entry for target address 70 provided by the fetch stage 6. Hence, if there is a miss in the branch prediction cache then this may trigger another line fill request 74 to request the corresponding portion of workload one's set of branch prediction state 60.

Another option can be to provide a branch prediction state prefetcher 86 as shown in FIG. 1, which is supplied with the sequence of instruction addresses looked up in the branch prediction cache 40-42, and detects whether a stride pattern of addresses with regular offsets between successive addresses is detected. When a stride pattern is detected, the prefetcher can trigger the linefill/writeback control circuitry 44 to issue additional linefill requests to the memory system for branch prediction state data associated with addresses extending beyond the current point of execution in intervals of the predicted address stride. When the actual pattern of addresses is detected to no longer follow the stride pattern, such prefetching can be halted until another stride pattern is detected. For example, any known prefetch technique used for prefetching instructions into an instruction cache 8 could also be applied to the branch prediction cache 40, 41, 42.

Note that as the branch prediction cache 40-42 is invalidated on a context switch so that it is not possible for an incoming software workload to hit against entry 64 that were populated based on outcomes derived from execution of another software workload, this means it is not necessary to tag each entry 64 with a workload identifier, reducing the area overhead for implementing the branch prediction cache 40-42 while still mitigating against the attack discussed above.

The branch prediction cache may cache branch prediction state such that independent predictions of branch instruction outcomes can be made for neighbouring blocks of addresses some minimum granularity size. For example if the minimum granularity size is 16 bytes for example then this may mean that all instructions within a 16-byte block may always have the same branch outcome predicted for that block, but an instruction in a neighbouring 16 byte block could have a different prediction made compared to the previous block. By defining some minimum granularity size this can reduce the overhead of the branch predictor since often it may be relatively uncommon for multiple branches to appear within the same block and additional structures could be provided for predicting such multi branch cases or alternatively the prediction state 72 in a BTB could be expanded to include information for account cases where there are multiple branches in one block.

However, although independent predictions can be made for neighbouring blocks of the minimum granularity size, it can be very expensive to provide sufficient items of branch prediction state that a completely separate branch prediction item can be maintained within the branch prediction set 60 for every possible block of addresses of that minimum granularity size. Instead, different blocks of addresses of the minimum granularity size may share the same item of branch prediction state data, with the mapping from a given instruction address to the corresponding item of branch prediction state being determined based on some hash function applied to the address which maps a larger address to a smaller identifier of a particular item of branch prediction state to access for that address.

In typical branch predictors, such a hash function is often designed to have as little locality as possible. The locality of the hash function refers to the property that addresses in nearby regions of the address space tend to be mapped onto the same item of branch prediction state. Hence, with a hash function providing very little locality this will tend to increase the likelihood that addresses from wildly different parts of the address space share the same branch prediction state while addresses in nearby regions in the address space tend to be mapped to different items of branch prediction state. This can be desirable for a typical branch predictor, to avoid hotspots where branches in nearby regions of program code are competing for access to the same branch prediction entry (which could result in reduced performance as they would train the branch predictor in a conflicting manner so that neither region receives an appropriate prediction for their actual branch prediction outcome). In contrast, branches at instruction addresses which are further apart in the address space are less likely to be executed near each other in the pipeline, and by the time processing reaches a given address then predictions of branch outcomes made for another address which is far away within the address space are less likely to be relevant. Hence, standard branch prediction hashing schemes tend to reduce locality and map addresses from different portions of the address space onto the same item of prediction state, typically at the granularity of the same minimum granularity size used by the branch predictions structure itself.

In contrast, with the approach shown in FIG. 1 where the RAM 34 is used as a backing store for cached prediction structures 40-42, such conventional branch prediction hashing schemes would provide poor performance. If the hashing scheme has very little locality then this means that, as the processing pipeline steps through a number of adjacent blocks of program instructions, each block may map to a different item of branch prediction state within the set 60 corresponding to the current software workload, and this may result in a large number of linefill fetch requests issued by the linefill/write back control circuitry 44 to increase the context switching latency and the memory bandwidth required for transfer of branch prediction state. Hence, standard hashing schemes may result in poor performance for the branch prediction caches 40-42.

Figure 5A:
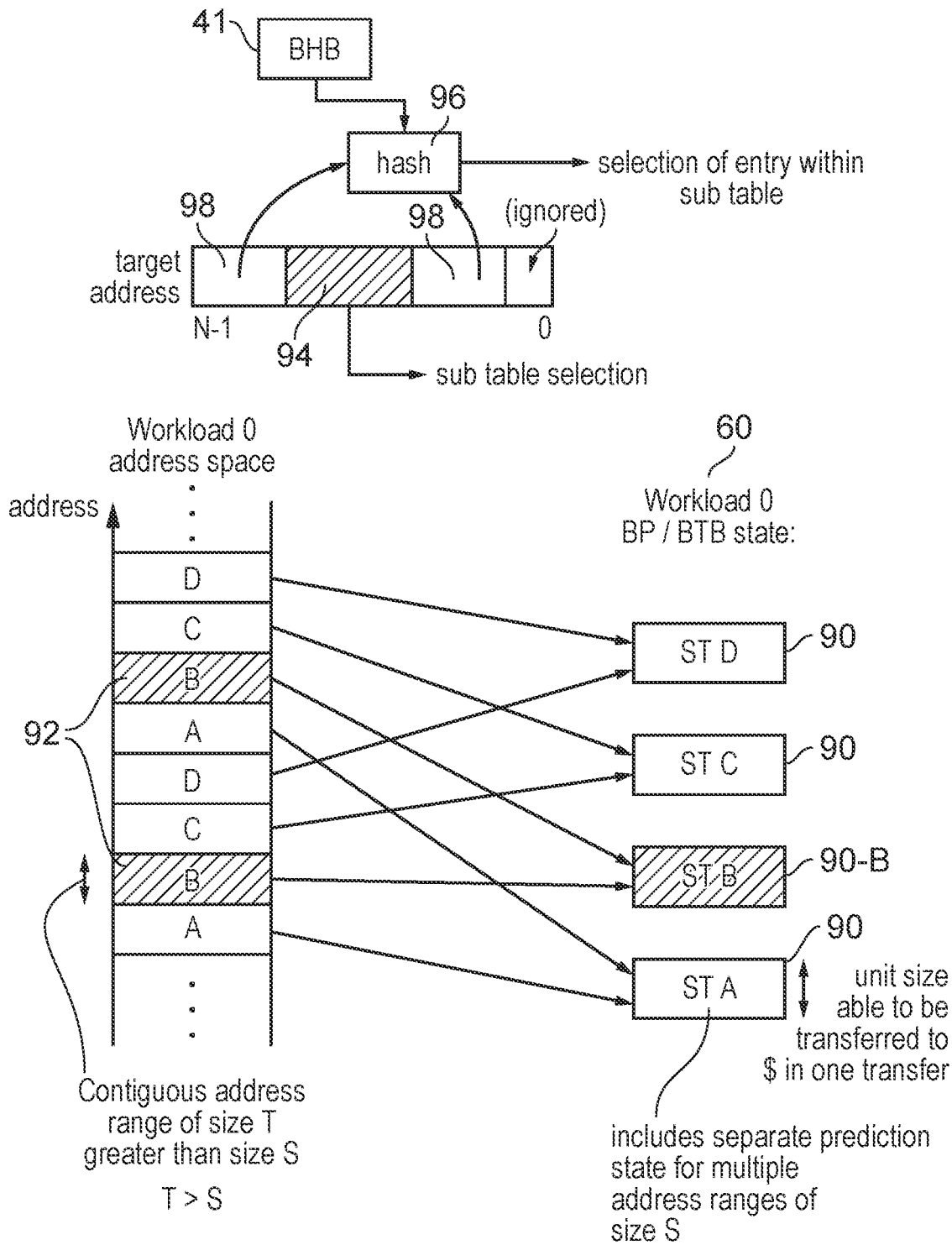
FIGS. 5A and 5B show an example of a cache organisation for improving locality.
Figure 5B:
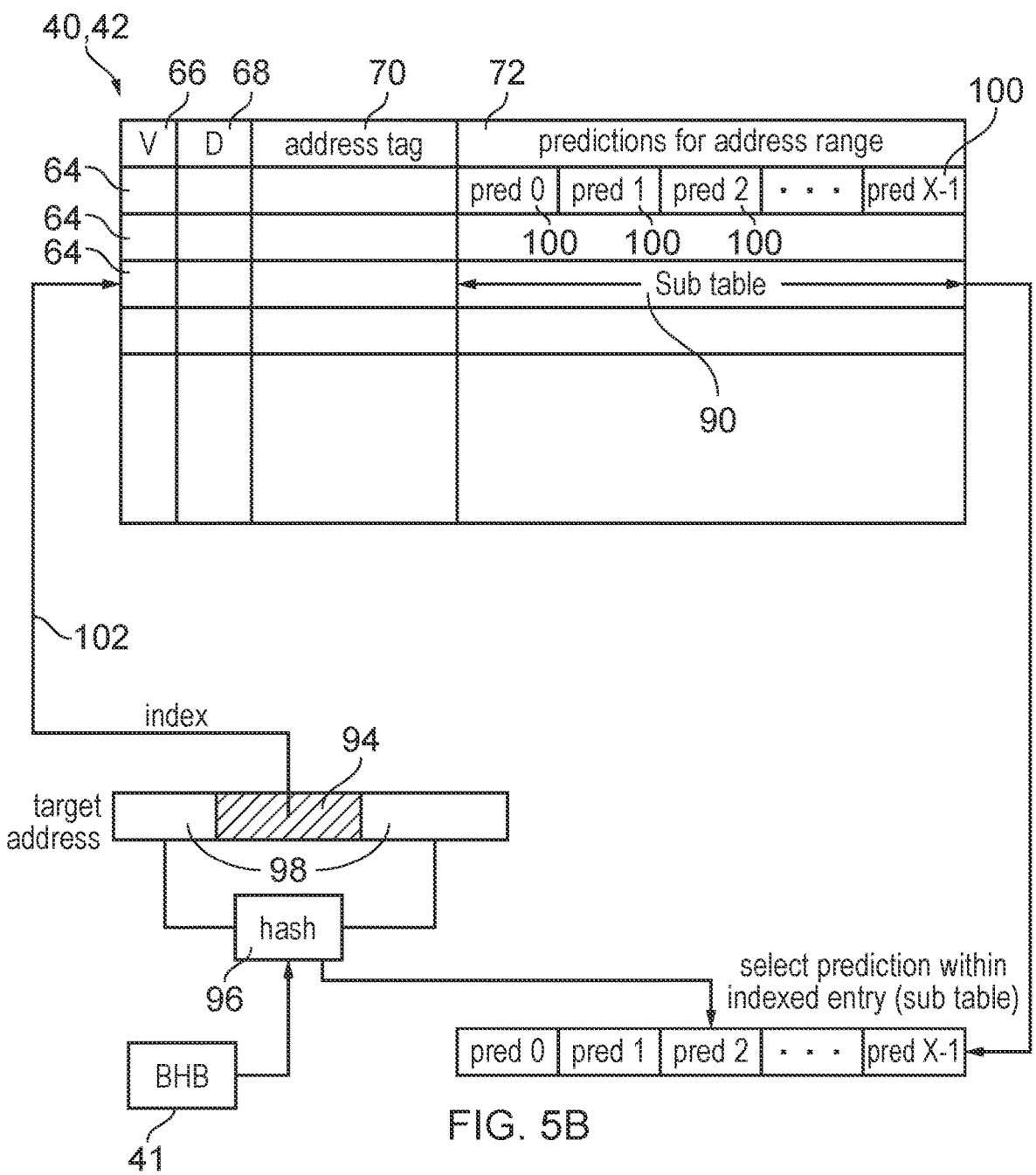

FIGS. 5A and 5B show an approach for reorganising the branch prediction cache 40 and the hashing algorithm used to generate the selection of the appropriate entry of branch prediction state so as to improve locality. As shown in FIG. 5A, the set of branch prediction state 60 for a given software workload may be divided into a number of sub tables 90 of a unit size which enables a sub-table 90 to be transferred to the branch prediction cache 40-42 in one data transfer. That is, the size of each sub-table 90 may correspond to one cache line. Each sub table may include a number of separate items of prediction state, with each item of prediction state corresponding to a given address range of the minimum granularity size S. Hence, each address range of size S may have an independent prediction made separately from the prediction made for the neighbouring block of addresses of size S.

As shown in the left hand size of FIG. 5A, the hash function applied to select the appropriate sub-table 90 for making the prediction for a given address may be such that the addresses are mapped to sub tables in blocks corresponding to a contiguous address range of a size T which is greater than size S. Hence, in this example all of the addresses within the contiguous address ranges marked B in FIG. 5A may each map to the same sub table 90-B. As shown in the top part of FIG. 5A, this can implemented, for example by using a first portion 94 of the target address to select the particular sub table 90 to be accessed and then applying the hash function 96 for selecting an individual prediction entry within the sub table to remaining (second) portion 98 of the address. In this example the first portion 94 is at an intermediate part of the address, so that the second portion 98 includes some less significant bits than the first portion and some more significant bits than the first portion. In other examples the first portion 94 could be at the upper end of the address so that only less significant bits are input to the hash function 96. Some address bits may not be used for either the sub-table selection or the hash function 96 (e.g. a lower portion may be ignored as shown in FIG. 5A). The hash function 96 which is applied to the second portion of the address can be of a similar design to standard branch prediction hashing functions, designed to provide very little locality. However, by excluding the first portion 94 from this hash function this means that there is increased locality compared to such standard hashing functions. This means that for all of the blocks of addresses for size S that are within a contiguous address range of size T, all of the relevant branch prediction state needed for predicting the branch outcome of any branch within that address range of size T can be transferred into the branch prediction cache 40-42 in a single data transfer. This helps to improve performance by reducing the number of separate accesses to memory required for predicting branch outcomes for addresses within the range of size T.

In some examples, in addition to the target address, the branch history information included in the BHB 41 can be used as an additional input to the hash function 96 used to generate the index into the branch prediction state. This can help to distinguish different routes into the same branch instruction within a program (depending on outcomes of previous branches), which can help to make more accurate predictions.

FIG. 5B shows an alternative arrangement of the branch prediction cache for use when the branch prediction state is arranged as shown in FIG. 5A. Again, in FIG. 5B each entry 64 has a valid bit 66, dirty bit 68 and address tag 70 as in FIG. 3. However, the prediction field 72 in FIG. 5 caches the sub-table 90 which was selected based on the first portion 94 of the target address as shown in FIG. 5A. As shown for one of the entries 64, each sub table may then include a number of separate items 100 of prediction state each corresponding to a different block of addresses of the minimum granularity size S. Hence with this arrangement each entry 64 corresponds to a block of addresses of size T but contains separate predictions for individual blocks of size S where T is greater than S. In this case, when accessing the branch prediction cache then the index 102 selecting which entry 64 to access is derived from the first portion 94 of the target address in the same manner as shown in FIG. 5A, and then a second portion 98 of the address (and optionally the branch history from the BHB 41) is input to a hash function 96 which is then used to select the particular prediction item 100 within the indexed entry 64 as shown at the bottom of FIG. 5B.

Hence, in FIGS. 5A and 5B each cache entry acts as an independent BP/BTB for some subset of the address space. For example, if the cache granules are chosen to be 64 bytes in size and the available RAM space is 16 kByte, then we can store 256 independent BP/BTBs in RAM. A simple scheme when performing a lookup would be to use bits 19:12 of the source address to decide which BP/BTB to perform a lookup in and then to perform the BP/BTB lookup within the 64-byte sub-BTB/BP in the usual way. This particular example would result in aliasing every megabyte and hashing could be used to mitigate this.

Figure 6:
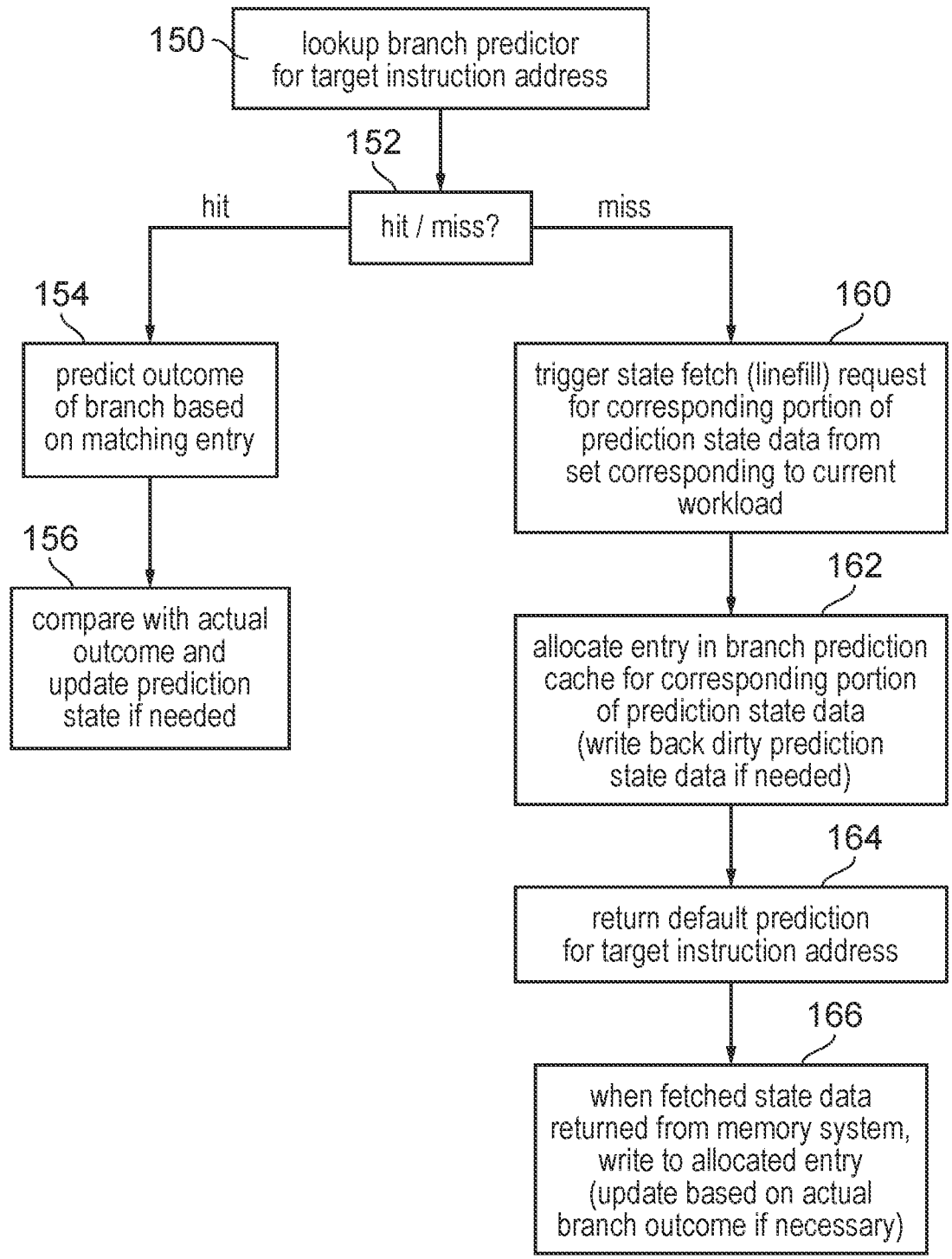
FIG. 6 is a flow diagram showing a method of making a branch prediction.

FIG. 6 shows a flow diagram illustrating a method of looking up the branch predictor 4 for a prediction for a given target instruction address. At step 150 the target instruction address is supplied to the branch predictor 4. At step 152 cache lookup circuitry associated with the branch prediction cache 40-42 determines whether there has been a hit or a miss for the looked up address. A hit occurs when the indexed entry of the cache structure includes a valid entry for which the address tag 70 matches a corresponding portion of the target instruction address. FIG. 6 is described in general with reference to the branch prediction cache but it will be appreciated that this could be either the direction prediction cache 40 or the branch target buffer cache 42.

If there is a hit in the branch prediction cache, then at step 154 a predicted outcome for a branch instruction is determined based on the matching entry which hit against the target address. The predicted outcome can be returned to the fetch stage 6 which may then fetch subsequent instructions based on the predicted branch outcome. Once the actual outcome of instructions corresponding to the target instruction address is known at the execute stage 18, then this may be signalled back to the branch predictor and at step 156 the branch predictor may compare the actual outcome with the indicated prediction state and update the prediction state if needed to change the prediction confidence level or the prediction itself.

If at step 152 a miss was detected in the branch prediction cache 40-42, then at step 160 the linefill and writeback control circuitry 44 triggers a state fetch request (or linefill request) to request that a corresponding portion of the set of prediction state data 60 which corresponds to the current workload is fetched into the relevant branch prediction cache 40-42. At this point the entry selection circuitry 45 could generate the address of the relevant branch prediction state by applying the approach shown in FIG. 5A select the appropriate sub-table and then to map this to the relevant address in memory which corresponds to that sub-table. For example the entry selection logic 45 within the linefill and writeback control circuitry may have a table specifying the addresses of each sub-table for the respective workloads. At step 162 an entry is allocated within the branch prediction cache 40-42 for storing the corresponding portion of prediction state once it is returned in response to the linefill request. If a victim entry is selected which already contains dirty data then this dirty prediction state is written back to the memory system. In systems where all entries in the branch prediction cache 40-42 relating to an outgoing workload are written back in response to a context switch then it may be assumed that any writeback triggered by a miss in the branch prediction cache would relate to the current workload and so in this case there may be no need to track any identification of a previous workload at the branch predictor beyond the context switch. In systems which instead reduce the overhead on a context switch by deferring writeback until a subsequent overwrite is required, then the branch prediction cache may store an additional identifier of a previously executed workload and may include a flag within each cache entry 64 marking whether an invalid entry with dirty data relates to the current workload or to the previously executed workload, so that it can be determined on a writeback which set of branch prediction state the dirty data needs to be written back to.

As the linefill request may take some time to be processed by the memory system, at step 164 the branch predictor 4 may return a default branch prediction as the predicted outcome 72 for the target instruction address. For example the default prediction could be that a branch should be predicted not taken if there is no branch prediction state available. By making a default prediction this allows subsequent instructions to continue to be fetched while waiting for the relevant prediction state to be returned, reducing the delay in processing subsequent instructions. If the default prediction turns out to be incorrect then this can be handled similar to other branch mispredictions. At step 166 when the branch prediction state is returned from the memory system 30, 32, 34 in response to the state fetch request, it is written to the entry of the branch prediction cache 40-42 which was allocated at step 162. If the actual branch outcome 38 is already available by this time and this is inconsistent with the current value indicated by the fetched state data then the fetched state data could also be updated based on the branch outcome if necessary in a similar way to updates to existing entries of the cache as described at step 156 above.

Figure 7:
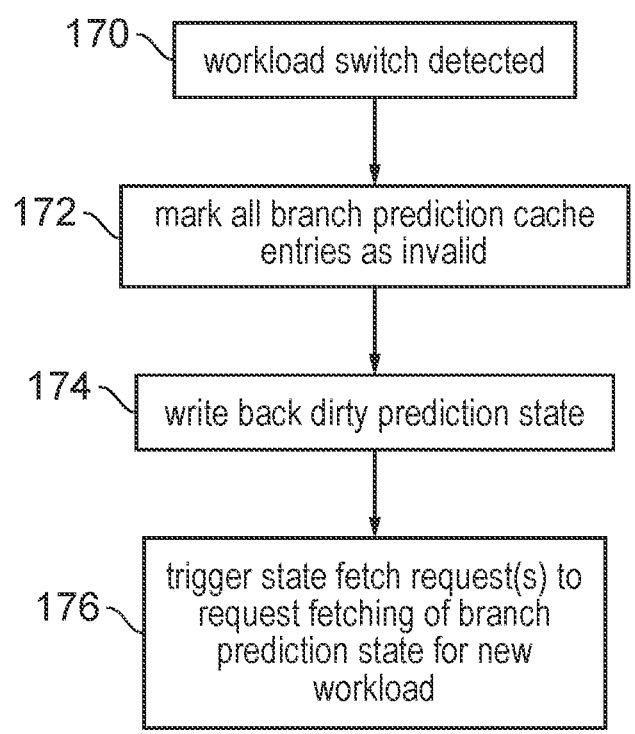
FIG. 7 shows a method of updating the branch prediction cache in response to a detected switch of processing workload.

FIG. 7 illustrates a flow diagram showing a method of processing switches of workload at the branch predictor 4. At step 170 a switch of processing workload is detected based on the workload switch signal 80. As discussed above, this signal could be provided by an interrupt controller, the execute stage 80 or the fetch or decode stages 6, 10 for example. At step 172, in response to the switch of workload, the branch prediction cache 40-42 updates all of its entries to mark each entry 64 as invalid by clearing the valid flag 66. This prevents the incoming workload hitting against entries allocated by the previous workload. At step 174 any dirty prediction state (indicated in entries having the dirty flag 68 set) is written back to memory by issuing writeback requests 78. Alternatively the writeback could be deferred until a subsequent linefill fetch 76 needs to overwrite the entry, but in this case then some additional tracking of which entries relate to the incoming workload and which relate to the outgoing workload may be required. Note that this tracking may still be more efficient then tagging each entry with a complete workload identifier, since a single bit flag could be enough to distinguish the incoming and outgoing workloads in each cache entry 64. A separate storage of the identifier of the outgoing workload shared between all entries could be enough to identify the outgoing workload without individually identifying it in each cache entry 64. Alternatively, other micro architectural implementations may prefer to simplify the writeback process by simply issuing all the write back requests in response to the context switch so that there is no need to consider any remaining dirty data from a previously executed workload once processing of the current workload has started.

At step 176, in response to the switch of software workloads the linefill/writeback control circuitry 44 also generates one or more state fetch requests 74 to request fetching of at least a portion of the set 60 of branch prediction state for the new incoming workload. This portion requested in response to the switch of workloads could be the entire set of branch prediction state 60 or could be a smaller portion, with remaining portions fetched on demand if necessary to produce a prediction for a target address 70 encountered in the subsequent processing of the new workload.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process instructions from a plurality of software workloads;
a branch prediction cache to cache branch prediction state data selected from a plurality of sets of branch prediction state data stored in a memory system, each set of branch prediction state data corresponding to one of said plurality of software workloads;
branch prediction circuitry to predict an outcome of a branch instruction of a given software workload based on branch prediction state data cached in the branch prediction cache from the set of branch prediction state data corresponding to said given software workload; and
selection circuitry to select, in response to a target address of a given instruction of the given software workload, a corresponding item of branch prediction state data from the set of branch prediction state data corresponding to the given software workload, the set of branch prediction state data corresponding to the given software workload comprising a plurality of sub-tables;
wherein the selection circuitry is configured to select one of said plurality of sub-tables based on a first portion of the target address, and to select an item of branch prediction state data from the selected sub-table based on a function of a second portion of the target address.

2. The apparatus according to claim 1, wherein in response to the processing circuitry switching from processing a first software workload to processing a second software workload, the branch prediction cache is configured to prevent cached branch prediction state data of the set of branch prediction state data corresponding to the first software workload being used to predict an outcome of a branch instruction of the second software workload.

3. The apparatus according to claim 1, in which the branch prediction cache comprises a plurality of entries, each entry for caching a corresponding portion of branch prediction state data independent of any indication of which set of branch prediction state data the corresponding portion of branch prediction state data is selected from.

4. The apparatus according to claim 1, in which the branch prediction cache is configured to ensure that all valid entries of the branch prediction cache relate to branch prediction state data from the same set of branch prediction state data corresponding to a given software workload.

5. The apparatus according to claim 1, in which:
in response to the processing circuitry switching from processing a first software workload to a second software workload, the branch prediction cache is configured to trigger at least one state fetch request to the memory system to request that a portion of the set of branch prediction state data corresponding to the second software workload is fetched into the branch prediction cache.

6. The apparatus according to claim 5, wherein said portion of the set of branch prediction state data comprises a proper subset of the set of branch prediction state data corresponding to the second software workload.

7. The apparatus according to claim 1, in which the branch prediction cache is responsive to a miss in the branch prediction cache for a target instruction address of an instruction of a given software workload for which a branch prediction is required, to trigger at least one state fetch request to the memory system to request that a corresponding portion of the set of branch prediction state data corresponding to the given software workload is fetched into the branch prediction cache.

8. The apparatus according to claim 1, in which the branch prediction cache is responsive to eviction of dirty branch prediction state data from the branch prediction cache to trigger at least one writeback request to request that the dirty branch prediction state data is written back to the memory system.

9. The apparatus according to claim 1, in which the branch prediction cache is configured to cache items of branch prediction state information at a granularity corresponding to an address range of a predetermined size, such that the branch prediction circuitry is capable of making different predictions of the outcome of a branch instruction for addresses in adjacent address ranges of said predetermined size; and
the apparatus comprises state transfer circuitry to transfer branch prediction state data between the branch prediction cache and the memory system in units of a given size, each unit comprising branch prediction state data for making branch predictions for at least one block of instruction addresses, each of said at least one block of instruction addresses covering a contiguous address range of a greater size than said predetermined size.

10. The apparatus according to claim 1, comprising a branch prediction state prefetcher to prefetch, into the branch prediction cache, branch prediction state data associated with addresses for which a branch prediction is predicted to be required in future.

11. The apparatus according to claim 1, in which said outcome of the branch instruction comprises a target address of the branch instruction.

12. The apparatus according to claim 1, in which said outcome of the branch instruction comprises whether a branch is taken or not taken.

13. The apparatus according to claim 1, in which for at least one of the software workloads, the set of branch prediction state data for a given software workload is stored in a memory region which is inaccessible to said given software workload.

14. The apparatus according to claim 1, in which each software workload comprises one of:
a software process executed by the processing circuitry;
a group of software processes executed by the processing circuitry;
a specific portion of a software process;
instructions of a software process having instruction addresses in a specific address range;
a portion of a software process bounded by one or more workload dividing instructions; and
one of a plurality of threads executed by the processing circuitry corresponding to the same process, or a sub-group of threads among said plurality of threads.

15. A data processing method comprising:
processing instructions from a plurality of software workloads;
caching, in a branch prediction cache, branch prediction state data selected from a plurality of sets of branch prediction state data stored in a memory system, each set of branch prediction state data corresponding to one of said plurality of software workloads;
predicting an outcome of a branch instruction of a given software workload based on branch prediction state data cached in the branch prediction cache from the set of branch prediction state data corresponding to said given software workload; and selecting, in response to a target address of a given instruction of the given software workload, a corresponding item of branch prediction state data from the set of branch prediction state data corresponding to the given software workload, the set of branch prediction state data corresponding to the given software workload comprising a plurality of sub-tables;

wherein one of said plurality of sub-tables is selected based on a first portion of the target address, and an item of branch prediction state data is selected from the selected sub-table based on a function of a second portion of the target address.

* * * * *